United States Patent
Venkataraja et al.

(10) Patent No.: US 10,496,446 B2
(45) Date of Patent: *Dec. 3, 2019

(54) ALTRUISTIC DEPENDABLE MEMORY OVERCOMMIT FOR VIRTUAL MACHINES

(71) Applicant: Oracle International Corporation, Redwood Shores, CA (US)

(72) Inventors: Hariprasad Nellitheertha Venkataraja, Karnataka (IN); Vijay Srinivas Agneeswaran, Karnataka (IN); Harish Chauhan, Karnataka (IN); Sharad Lal, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/582,780

(22) Filed: May 1, 2017

(65) Prior Publication Data

US 2017/0235615 A1 Aug. 17, 2017

Related U.S. Application Data

(63) Continuation of application No. 12/534,718, filed on Aug. 3, 2009, now Pat. No. 9,740,533.

(51) Int. Cl.
*G06F 9/455* (2018.01)
*G06F 9/50* (2006.01)
*G06F 9/48* (2006.01)

(52) U.S. Cl.
CPC ........ *G06F 9/5077* (2013.01); *G06F 9/45558* (2013.01); *G06F 9/4881* (2013.01); *G06F 2009/45583* (2013.01)

(58) Field of Classification Search
CPC ... G06F 9/5077; G06F 9/45558; G06F 9/4881
See application file for complete search history.

(56) References Cited

U.S. PATENT DOCUMENTS 7,433,951 B1 10/2008 Waldspurger
7,594,006 B2 9/2009 Rolia et al.
(Continued)

OTHER PUBLICATIONS

Kivity, A., "Memory overcommit with kvm," Ari Kivity's blog, 2008, 3 pages.

(Continued)

*Primary Examiner* — James J Lee
(74) *Attorney, Agent, or Firm* — Fish IP Law, LLP

(57) ABSTRACT

This disclosure describes, generally, methods and systems for implementing memory overcommit of virtual machines. The method includes establishing a plurality of virtual machines on a physical machine, broadcasting, from each of the plurality of virtual machines to a central scheduler, resource usage requirements, and then based at least in part on the resource usage requirements broadcasted from each of the plurality of virtual machines, determining a resource requirements schedule for each of the plurality of virtual machines. The method further includes receiving at least one resource request from at least one of the plurality of virtual machines, based on the resource requirements schedule, un-assigning resources from at least one of the plurality of virtual machines, and assigning the un-assigned resources to the at least one of the plurality of virtual machines which initiated the resource request.

20 Claims, 7 Drawing Sheets

(56) References Cited

U.S. PATENT DOCUMENTS

| | | |
|---|---|---|
| 7,620,955 B1 | 11/2009 | Tene |
| 2005/0039183 A1 | 2/2005 | Romero et al. |
| 2007/0294501 A1 | 12/2007 | Wolf |
| 2008/0126547 A1 | 5/2008 | Waldspurger |
| 2008/0163210 A1 | 6/2008 | Bowman et al. |
| 2009/0070776 A1 | 3/2009 | Dahlstedt |
| 2009/0300605 A1* | 12/2009 | Edwards ............... G06F 9/5077 718/1 |
| 2009/0307686 A1 | 12/2009 | Hepkin |
| 2010/0005173 A1* | 1/2010 | Baskaran ............. G06F 9/5066 709/226 |
| 2010/0100877 A1 | 4/2010 | Greene et al. |
| 2011/0119748 A1* | 5/2011 | Edwards ............... G06F 9/5077 726/12 |

OTHER PUBLICATIONS

Magenheimer, D., "Memory Overcommit . . . without the commitment," Zen Summit 2008, 3 pages.

Rizzo, J., "Parallels Desktop 4 expands graphics, CPU, RAM, more user features, runs Leopard Server in VM," MacWindows.com, [online], 2008, [retrieved on Dec. 8, 2008], 3 pages. Retrieved from: http://www.macwindows.com/desktop4.html.

Waldspurger, C., "Memory Resource Management in VMware ESX Server," Proceedings of the 5th Symposium on Operating Systems Design and Implementation, 2002, 14 pages.

* cited by examiner

US 10,496,446 B2

ALTRUISTIC DEPENDABLE MEMORY OVERCOMMIT FOR VIRTUAL MACHINES

This application is a continuation of U.S. application Ser. No. 12/534,718, filed Aug. 3, 2009. U.S. application Ser. No. 12/534,718 is incorporated by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to memory management in virtual machines (VMs) and, more particularly, to altruistic memory management in VMs.

BACKGROUND

In general, virtualization allows multiple "machines" or operating system instances to be run on the same physical machine at the same time. A software entity known as the hypervisor (or a Virtual Machine Monitor) interfaces between the hardware and the operating system instances, such that each operating system instance (or virtual machine) is made to believe that it has complete control of the hardware of the physical machine (that has been allotted), while in reality the hypervisor ultimately has complete control.

The number of such virtual machines that can be run on a given physical machine is typically limited by the hardware resources available on the physical machine. Common hardware factors that drive this decision making are, for example, the number (and capacity of) CPUs, the amount of memory available, and the amount storage available on the physical machine. Typically, each virtual machine is statically allotted a certain number of CPUs (known as Virtual CPUs or VCPUs) and a certain amount of memory. This allocation is constantly maintained throughout the life cycle of the virtual machine.

Better resource utilization can be achieved if it were possible to dynamically alter the amount of resources available to a virtual machine. As such, new features in the hypervisor make it possible to reduce or increase the amount of memory available to a virtual machine even when the physical machine is running. For example, the Xen hypervisor and provides such capabilities through a memory ballooning driver. This technique consists of inserting a memory balloon driver into each of the virtual machines, and when it is required for a virtual machine to reduce its memory consumption, the resident balloon driver "demands" more memory from the operating system kernel of the virtual machine. Whatever memory is allocated to the virtual machine is "released" to the hypervisor. The hypervisor can then use this available memory for other virtual machines. If the memory pressure on such a virtual machine increases (e.g., due to increased usage by other applications within the same virtual machine), the balloon driver "deflates" and the hypervisor returns the actual physical memory back to the virtual machine.

Even though this feature makes it possible to do what is commonly referred to as a memory "overcommit" (which means that the sum total of memory allocated to all virtual machines on a particular physical machine exceeds the net physical memory available on the machine, since machines do not completely use up all memory allocated to them at all times, such an overcommit is possible), the weakness of such an approach is that the hypervisor does not have enough information on how much free memory is available with each of the virtual machines. Lacking such information, the hypervisor cannot make intelligent decisions regarding which combinations of virtual machines to place on a physical machine. Hence, for at least these reasons, there is a need for improvements in the art.

BRIEF SUMMARY

Embodiments of the present invention are directed to a computer implemented method of implementing memory overcommit of virtual machines. The method includes establishing a plurality of virtual machines on a physical machine, broadcasting, from each of the plurality of virtual machines to a central scheduler, resource usage requirements, and then based at least in part on the resource usage requirements broadcasted from each of the plurality of virtual machines, determining a resource requirements schedule for each of the plurality of virtual machines. The method further includes receiving at least one resource request from at least one of the plurality of virtual machines, based on the resource requirements schedule, un-assigning resources from at least one of the plurality of virtual machines, and assigning the un-assigned resources to the at least one of the plurality of virtual machines which initiated the resource request.

In an alternative embodiment, a machine-readable medium implementing memory overcommit of virtual machines. The machine-readable medium includes instructions for establishing a plurality of virtual machines on a physical machine, receiving resource usage pattern information for each of the plurality of virtual machines, and then identifying at least two of the plurality of virtual machines which have complementary resource usage patterns. The machine readable medium further includes instructions for tying together the at least two identified complementary virtual machines into a resource sharing symbiotic pair. The at least two virtual machines in the pair release resources to fulfill the opposite virtual machine's resources requirements.

In yet another embodiment, a method of implementing memory overcommit of virtual machines, is described. The method includes implementing a plurality of virtual machines on a data center. The data center includes a plurality of physical machines. The method further includes analyzing memory usage for each of the plurality of virtual machines, based on the memory usage for each of the plurality of virtual machines, identifying machines which have complementary memory usage, and grouping the virtual machines with complementary memory usage together and running the grouped virtual machines together on one of the plurality of physical machines in the data center.

In a further embodiment, a system for implementing memory overcommit of virtual machines, is described. The system includes a computer system having a central processing unit (CPU), a memory device, and a storage device. The computer system in configured to run a plurality of virtual machines which share the CPU, memory device, and the storage device. The computing system further includes a central scheduler which is configured to receive, from the plurality of virtual machines resource usage requirements, and based at least in part on the resource usage requirements from each of the plurality of virtual machines, determine a resource requirements schedule for each of the plurality of virtual machines. The central scheduler is further configured to receive at least one resource request from at least one of the plurality of virtual machines, based on the resource requirements schedule, un-assign resources from at least one of the plurality of virtual machines, and assign the un-assigned resources to the at least one of the plurality of virtual machines which initiated the resource request.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
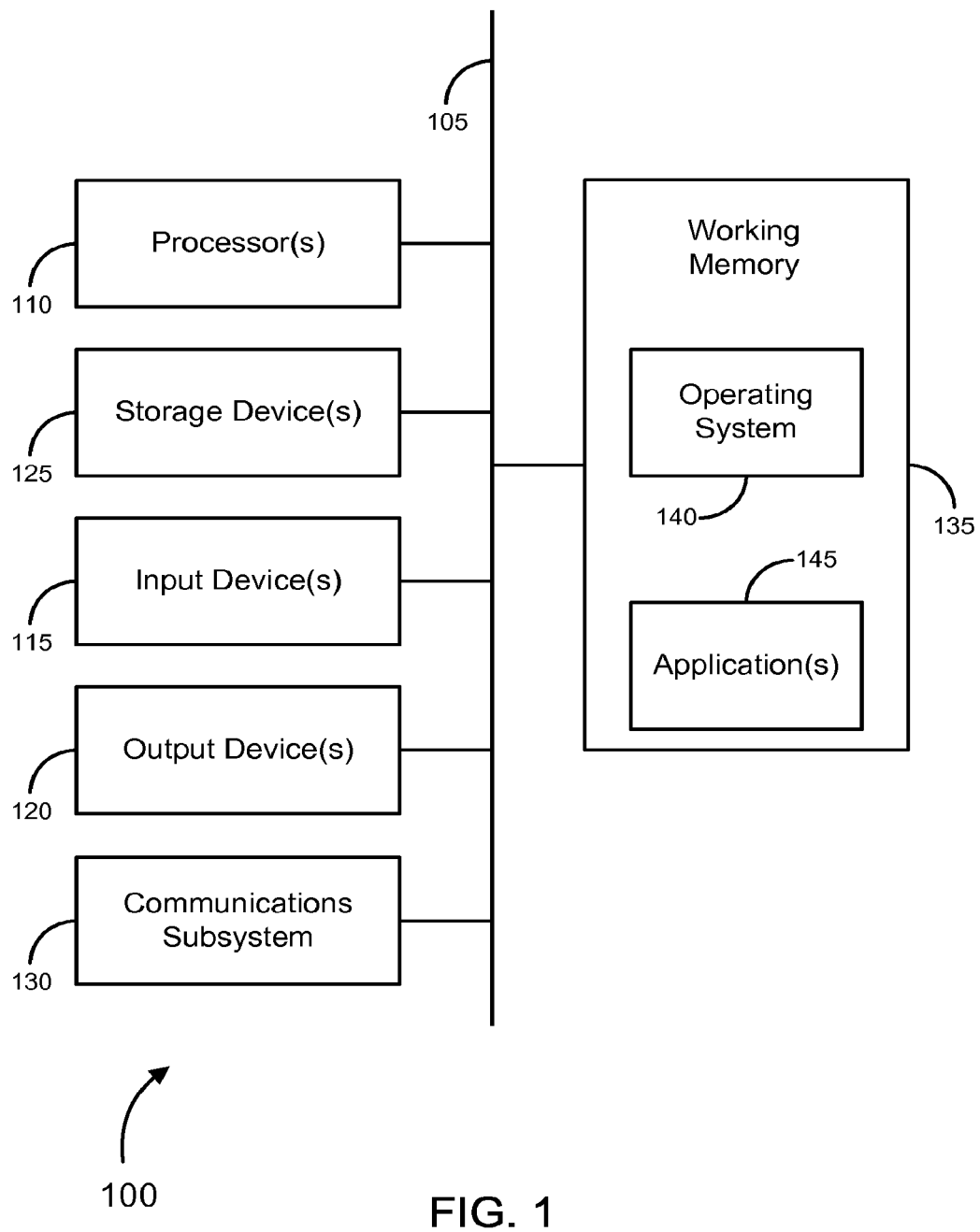
FIG. 1 is a generalized schematic diagram illustrating a computer system, in accordance with various embodiments of the present invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to, for example, a grid system which uses virtualization. Within such a system, multiple virtual machines are running on one physical machine at any given time. Further, depending upon application load and other requirements, the number of virtual machines running on the grid can be increased or decreased (i.e., the grid can be scaled-out or scaled-in). Using the memory overcommit feature of the hypervisor, each virtual machine is given an "abundant" amount of memory such that the sum total of memory allocated to virtual machines running on a physical machine exceeds the actual physical memory available. Then, a central Grid scheduler manages the starting, stopping, and/or scheduling of these virtual machines.

Aspects of the present invention further proposes an altruistic memory overcommit strategy for running such virtual machines. Under this scheme, each virtual machine, by virtue of being aware of the nature of applications that it will host, "advertises" to the central grid scheduler, the amount of memory it can "part" with at various points in time. For example, during certain days of the week, at certain times of the day, etc. during a day. Most applications have a predictable pattern with regard to their memory consumption, and at certain times their memory consumption less while at other times, their memory consumption is greater.

For example, an e-commerce application is likely to have reduced memory requirements during the night-time hours, while the e-commerce application may have higher memory consumption during day-time hours. By becoming aware of such memory usage patterns, the grid scheduler has a sufficient amount of information about which virtual machine has available memory at what point in time (and how much memory is available).

The advertisement made by each virtual machine can be represented in the form of, for example, a tuple [VM_id, VCPU, VMem_Reg, Vmem_Max, Vmem_min, MaxConstraints, MinConstraints]. Where VMem_Reg represents the memory used by the virtual machines under regular conditions, Vmem_Max represents the possible maximum usage of memory by this virtual machine, and the MaxConstraints captures the window (time interval—could be peak-working hours for some virtual machines or could be busy-time for some virtual machines) when the virtual machine is likely to utilize a maximum amount of memory. Similarly, Vmem Min represents the minimum memory for a virtual machine which would be sufficient during the Vmem_Min period. This advertisement may then be sent to a grid scheduler for use in scheduling memory allocation and virtual machine groupings. Furthermore, the grid scheduler can be implemented in a centralized fashion or in a decentralized fashion by the grid.

Further aspects of the present invention recite that whenever a new virtual machine is to be started, the virtual machine "informs" the grid scheduler of its memory usage pattern. This includes demand for additional memory during peak load times and the quantity of memory available for sharing during off-peak load times. Using this information and the data from the other virtual machines, the grid scheduler selects a physical machine which best "complements" this new machine's requirement. Whenever a particular virtual machine requests more memory, either explicitly or by virtue of the hypervisor spotting an increase in load, the grid scheduler then "chooses" a particular virtual machine (or a set of machines) to source this request. Depending on the type of hypervisor, the appropriate memory ballooning techniques are invoked and additional memory is obtained.

Thus, aspects of the present invention allows for virtual machines on a physical machine to co-operate with each other and share their memory, which leads to a safer and predictable memory overcommit scenario. In a further embodiment, aspects of the present invention may be extended to work with VCPUs (Virtual CPUs—CPUs allocated to virtual machines) if CPU overcommit is implemented in Xen or other hypervisors. Further, aspects of the present invention may also be implemented with any distributed VM management, in general, and not necessarily through a grid. For example, VMWare's VI3™ or BEA's AppLogic™ can be utilized in implementing aspects of the present invention and can provide predictable memory overcommit without the use of a grid.

Accordingly, with the use of the present invention, using memory overcommit features of virtual machines becomes extremely safe and reliable. With the virtual machines co-operating in the releasing and acquiring of memory based on load, the grid scheduler is aware of the availability of resources at various points in time and can do a much better job of matching resources to load.

According to an alternative embodiment of the present invention, a pair of virtual machines with complementary memory requirements may be tied together to run a symbiotic memory overcommit relationship. Whenever one virtual machine requires additional memory, the other virtual machine can release the required amount based on, for example, a pre-agreed quantity. A physical machine can host several such "virtual machine pairs", each of which have their memory requirements completely satisfied by the partner machine and hence memory overcommit can exceed physical memory by a significant amount.

Additionally, another technique that can be used to better schedule machines is to scan machines in an existing data center, and after obtaining the "advertisements" from all participating machines, the grid scheduler can perform a re-arrangement of the virtual machines such that all the virtual machines on a physical machine complement each other in terms of their peak and low memory requirements, thereby allowing higher levels of memory overcommit.

Turning now to FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
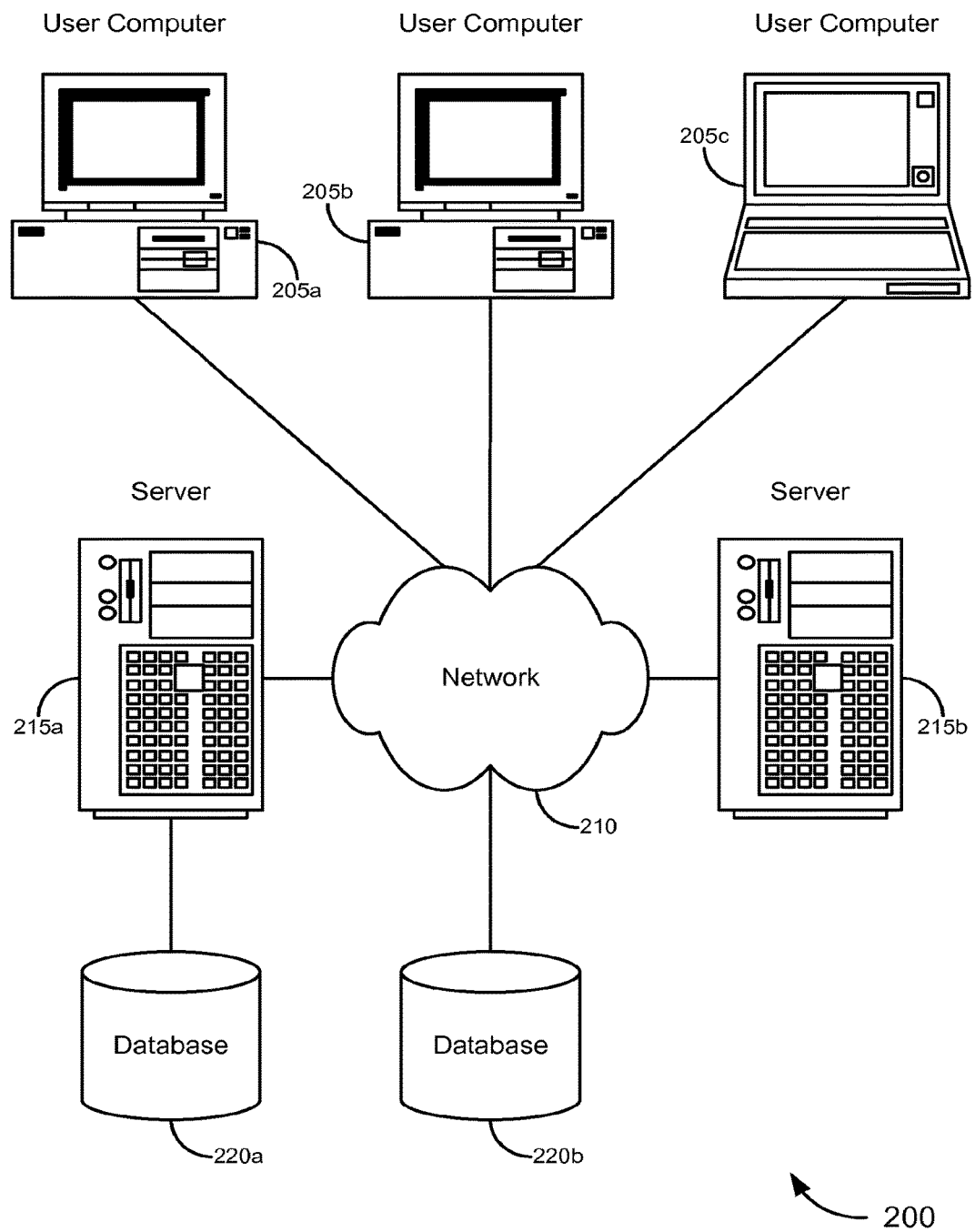
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™ Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
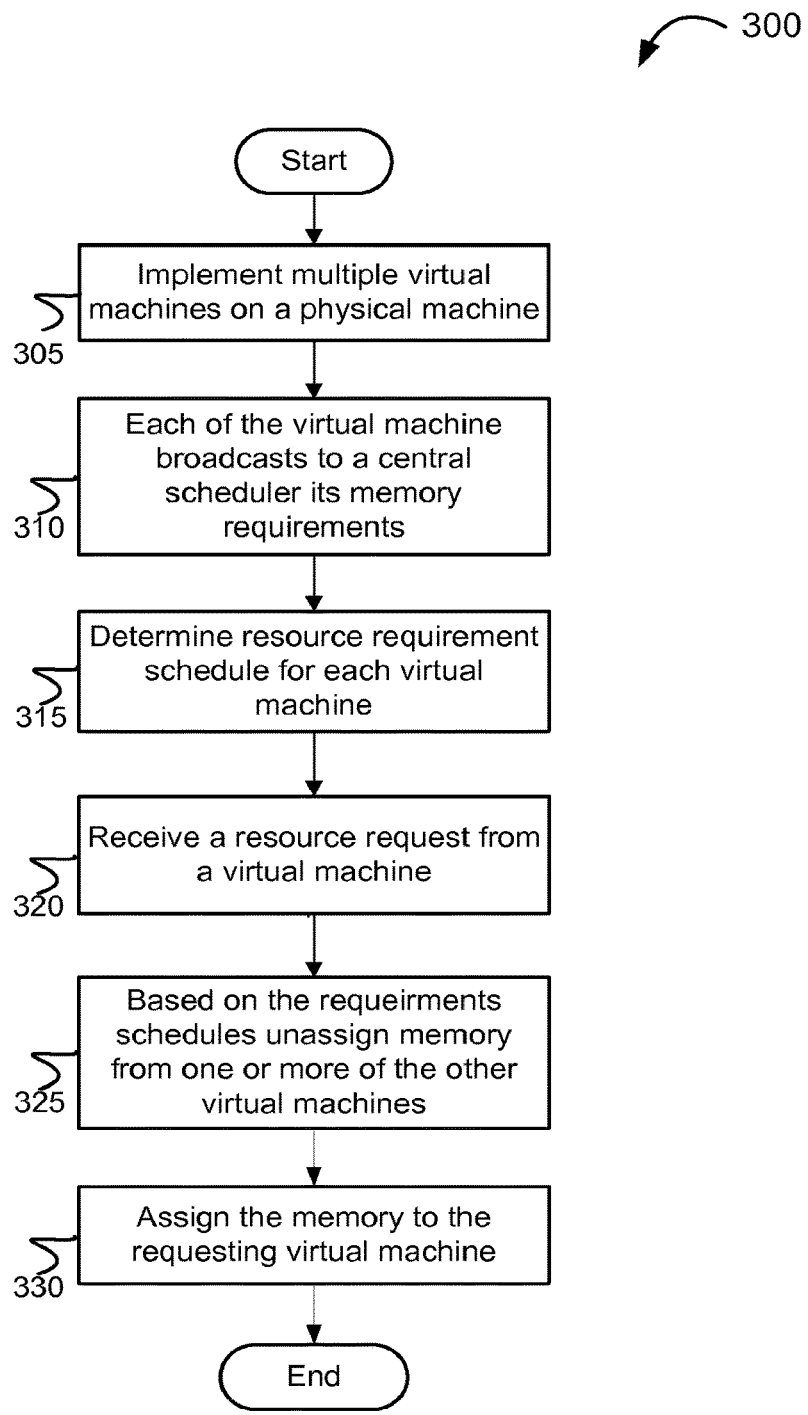
FIG. 3 is a flow diagram illustrating a method of implementing altruistic dependable memory overcommit in virtual machines (VMs), in accordance with one embodiment of the present invention.

Turning now to FIG. 3, which illustrates a method 300 of implementing memory overcommit in virtual machines. At process block 305, multiple virtual machines may be implemented on a physical machine. In one embodiment, a virtual machine is a software-based computer system which runs on a physical computer system and shares the physical computer system's resources (e.g., central processing unit (CPU), memory, storage capacity, network interface, etc.) among multiple virtual machines. Memory (or resource) overcommit is a process which allows for the total resource allotment assigned to the virtual machines, to exceed the total amount of resources of the physical machine.

At process block 310, a broadcast of resource requirements from each of the virtual machines is received by, for example, a central scheduler. In one embodiment, the virtual machines may be setup on a grid, and the central scheduler may be a grid central scheduler. Furthermore, in a further embodiment, the central scheduler may receive the broadcasted information through a hypervisor which is configured to implement memory and resource overcommit.

In one embodiment, the resource requirements may be a resource usage schedule for each of the virtual machines. For example, one virtual machine may run a system backup process which performs nightly backups of data for a certain enterprise application. Accordingly, the virtual machine would use a very small amount of system resources during the day hours (e.g., from 6 a.m. to 7 p.m.), but would require significantly more resources during the night hours (e.g., 7 p.m. to 6 a.m.). Furthermore, the backups my only occur on weeknights or conversely only on the weekend. Thus, this virtual machine would broadcast its resource requirements accordingly.

Hence, based on the resource requirement information received from each of the virtual machines, the central scheduler may then determine a resource requirements schedule for each of the virtual machines (process block 315). Such a schedule may include a matrix (or the like) broken into days and times for each of the virtual machines, as well as the physical resources of the physical machine. The matrix would then be filled in the resource requirements for a given resources by a given virtual machine at a given time on a given day of the week.

Therefore, at process block 320, when a resource request is received by the central scheduler from one of the virtual machines, the central scheduler is aware of which virtual machines can afford to have resources reassigned, and for how long the virtual machine can be without the reassigned resources. In other words, the central scheduler is aware of which virtual machines have excess resources which are allocated to them and at what time and for how long they will be in excess.

At process block 325, based on the requirements schedule, the central scheduler un-assigns the requested resources from another virtual machine (or machines). Then, at process block 330, the "freed" memory is then assigned to the requesting virtual machines. Accordingly, the requesting virtual machine's resource need is met, and the other virtual machines from which the resources where "borrowed" do not suffer a slowdown, or even worse a memory related error.

Figure 4:
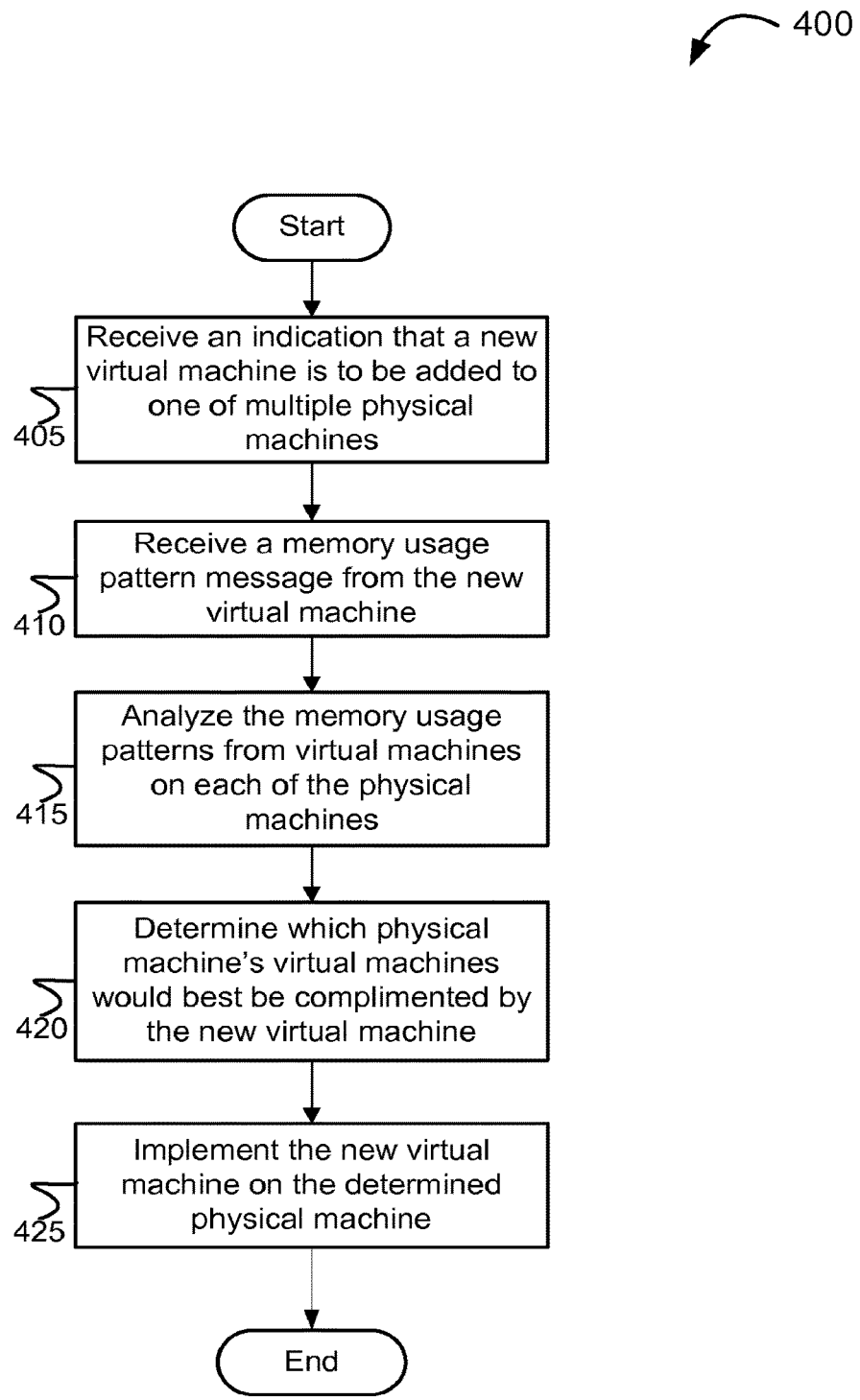
FIG. 4 is a flow diagram illustrating a further method of implementing altruistic dependable memory overcommit in VMs, in accordance with a further embodiment of the present invention.

Referring next to FIG. 4, which illustrates a method 400 of integrating additional virtual machines into a physical machine. At process block 405, the central scheduler may receive an indication that a new virtual machine is to be added to one of the physical machines. For example, an administrator or other system operator may be adding a new process or system functionality to the physical machine. Hence, at process block 410, the central scheduler may receive a memory usage pattern from the new virtual machine. In one embodiment, the memory usage pattern may include the amount and type of resources the virtual machine uses and when those resources are needed.

At process block 415, an analysis of the memory usage patterns of the existing virtual machines running on the physical machines and the new virtual machines' memory usage pattern is performed. At process block 420, a determination is made by the central scheduler as to which of the physical machines (based on the virtual machines already running on the physical machine) would best be complemented by the virtual machine. In other words, which of the physical machines would be able to best accommodate the memory requirements of the new virtual machine based on the current memory requirements of the virtual machines already running on the physical machine. Then, at process block 425, the new virtual machine is implemented on the determined physical machine.

Figure 5:
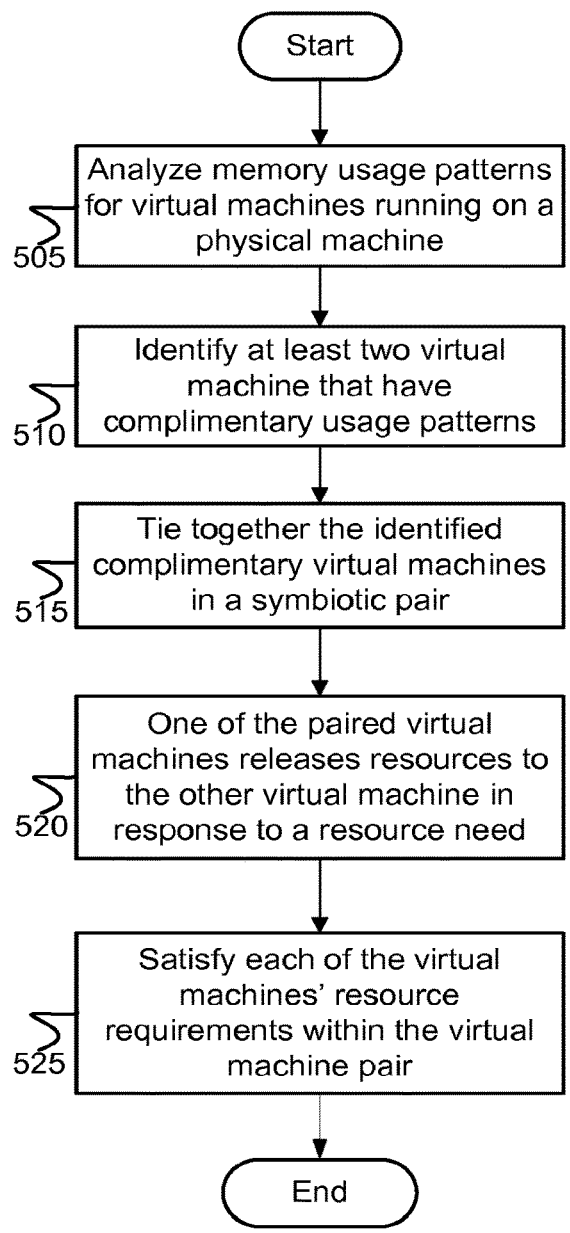
FIG. 5 is a block diagram illustrating a system for implementing altruistic dependable memory overcommit in VMs, in accordance with one embodiment of the present invention.

Now referring to FIG. 5, which illustrates a method 500 of establishing symbiotic virtual machine pairing or groupings. In one embodiment, a symbiotic virtual machine pairing or groupings includes pairing or grouping two of more virtual machines into a resource sharing relationship which allows for both machines to receive optimal resource utilization. For example, using the backup system from above and an ecommerce system. Such that the ecommerce system has peek resource usage from 6 a.m. to 7 p.m., the two virtual machines could work in a perfect symbiotic pairing. When the backup system needs more resources at night, the ecommerce system has resources available, and when the ecommerce system needs more resources during the day, the backup system has resource available.

Accordingly, at process block 505, an analysis of virtual machines running on a physical machine can be made, and then based on that analysis, two of more virtual machines can be paired or grouped which have complementary memory usage patterns (process block 510). At process block 515, the identified virtual machines are tied together in a symbiotic pair or group.

At process block 520, one of the paired virtual machines may release resources (automatically) to the other virtual machine in resource to the need of the other virtual machine, and vise versa. Accordingly, at process block 525, each of the resource requirements of the virtual machines in the pairing or grouping are satisfied.

Figure 6:
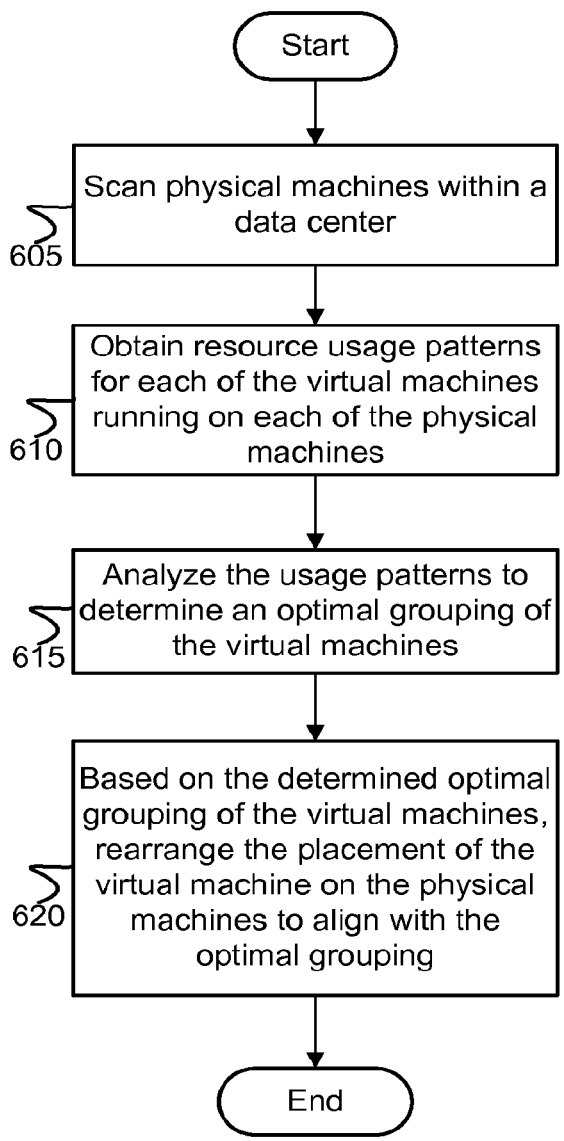
FIG. 6 illustrates a method of reallocating virtual machines among physical machines, in accordance with an embodiment of the present invention.

Next referring to FIG. 6, which illustrates a method 600 of reallocating virtual machines among physical machines in a data center, data farm, or the like. In one embodiment, a data center may include a number of physical machines, each of which in turn include a number of virtual machines. However, the distribution of virtual machines among the physical machines may not be in the optimal configuration such that the virtual machines on the physical machines complement each other in terms of resource requirements and usage patterns.

Accordingly, at process block 605, the physical machines with the data center may be scanned in order to obtain resource usage patterns for each of the virtual machines running on each of the physical machines (process block 610). Then, at process block 615, an analysis of the patterns is made to determine an optimal grouping of the virtual machines. For example, if the data center includes three physical machine (M1, M2, M3) and each of the physical machines includes three virtual machines (V1, V2, V3 on M1, V4, V5, V6 on M2, and V7, V8, V9 on M3) a reconfiguration of virtual machines based on usage patterns and resource requirements may look like this. V2, V6, and V8 running on M1, V1 and V9 running on M2, and V3, V4, V5, and V7 running on M3.

In other words, the virtual machines are rearranged on the physical machines to align with an optimal working configuration (process block 620). Accordingly, each of the virtual machines running on the physical machine will have the most complementary resource usage requirements as to optimally utilize the limited resources of the physical machine.

Figure 7:
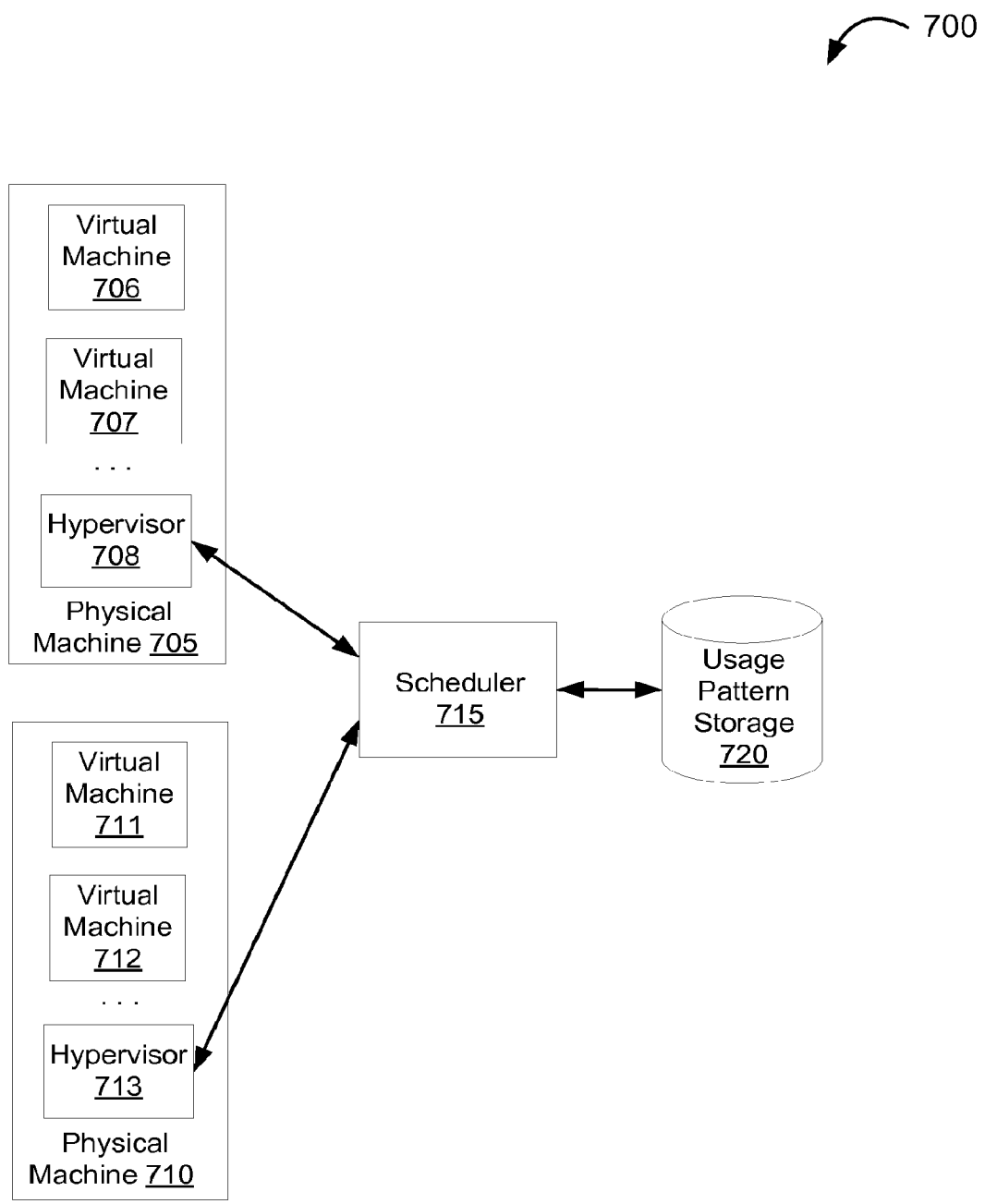
FIG. 7 illustrates a system for implementing memory overcommit for virtual machines, according embodiments of the present invention.

Turning now to FIG. 7, which illustrates a system 700 for implementing memory overcommit for virtual machines. System 700 may be used to implement any one of methods 300, 400, 500 or 600 from FIG. 3, 4, 5, or 6. Furthermore, the computer systems in system 700 may be any one of the computer systems described in FIGS. 1 and 2. System 700 may include a physical machine 705 and a physical machine 710. It should be noted that more or fewer physical machine may be included, but for the sake of illustration, only two physical machines are shown.

Each of physical machines 705 and 710 may include any number of virtual machines, for example, virtual machines 706 and 707 on physical machine 705, and virtual machines 711 and 712 on physical machine 710. Furthermore, each of physical machines 705 and 710 may include a hypervisor 708 and 713, respectively. Each of hypervisors 708 and 713 are configured to be in communication with a scheduler 715. In one embodiment, scheduler 715 is the central scheduler or grid central scheduler, described above. Furthermore, system 700 may include a usage pattern storage 720 in communication with scheduler 715.

In one embodiment, the computer systems of system 700 are utilized to implement the methods of FIGS. 3-6 in such a way as to provide altruistic memory overcommit amount virtual machines 706, 707, 711, and 712, in accordance with the methods described above.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing memory overcommit of virtual machines, the method comprising:
   obtaining, by a central scheduler, resource usage requirements for each of a first plurality of virtual machines on a first physical machine;

determining, by the central scheduler, a resource requirements schedule for each of the first plurality of virtual machines based on the resource usage requirements;

assigning, by the central scheduler, resources to each of the first plurality of virtual machines based on the resource requirements schedule, wherein a sum total of the resources allocated to the first plurality of virtual machines is greater than actual resources available;

identifying, by the central scheduler and using the resource requirements schedule, that a first virtual machine of the first plurality of virtual machines and a second virtual machine of the first plurality of virtual machines have a complementary resource usage pattern;

tying, by the central scheduler and based on the identification, the first virtual machine and the second virtual machine together to obtain a symbiotic pair of virtual machines; and releasing automatically to the second virtual machine, by the first virtual machine and based on being included in the symbiotic pair of virtual machines, a portion of the resources assigned to the first virtual machine to satisfy a resource need of the second virtual machine.

2. The method of claim 1, wherein the resource usage requirements for each of the plurality of virtual machines comprises at least one of:
   a resource usage schedule broadcast by each of the first plurality of virtual machines; and
   a memory usage pattern of each of the first plurality of virtual machines determined via an analysis of each of the first plurality of virtual machines.

3. The method of claim 1, further comprising:
   obtaining, by a central scheduler, resource usage requirements for a second plurality of virtual machines on at least one second physical machine;
   determining, by the central scheduler, a resource requirements schedule for each of the second plurality of virtual machines based on the resource usage requirements for the second plurality of virtual machines;
   assigning, by the central scheduler, resources to each of the second plurality of virtual machines based on the resource requirements schedule of each of the second plurality of virtual machines, wherein a sum total of the resources allocated to the second plurality of virtual machines is greater than actual resources available on the at least one second physical machine;
   identifying, by the central scheduler and using the resource requirements schedules of each of the first plurality of virtual machines and the second plurality of virtual machines, that at least one pair of virtual machines from at least one of the first plurality of virtual machines and second plurality of virtual machines have a complementary resource usage pattern;
   tying, by the central scheduler and based on the identification, the at least one pair of virtual machines together to obtain at least one symbiotic pair of virtual machines; and
   redistributing the virtual machines from the first plurality of virtual machines and the second virtual machines among the first physical machine and the at least one second physical machine based on the at least one symbiotic pair.

4. The method of claim 3, further comprising releasing automatically to one of the virtual machines of the at least one symbiotic pair, by the other of the virtual machines of the at least one symbiotic pair, a portion of the resources assigned to the one of the virtual machines of the symbiotic pair to satisfy a resource need of the other of the virtual machines of the at least one symbiotic pair.

5. The method of claim 1, wherein the resource usage requirements includes at least one or more of the following: memory usage, central processing unit (CPU) usage, storage space usage, and bandwidth usage.

6. The method of claim 1, wherein the resource requirements schedule includes one or more of the following: time of day for which resources are used, day of the week for which resources are used, and amount of resources used at a given time or day.

7. The method of claim 1, further comprising sharing, among the first plurality of virtual machines, at least one of a CPU, a memory device, a storage device, and a network interface device of the first physical machine.

8. A non-transitory computer-readable medium storing instructions that, when executed by at least one processor, cause the at least one processor to execute the steps to:
   obtain resource usage requirements for each of a first plurality of virtual machines on a first physical machine;
   determine the a resource requirements schedule for each of the first plurality of virtual machines based on the resource usage requirements;
   assign resources to each of the first plurality of virtual machines based on the resource requirements schedule, wherein a sum total of the resources allocated to the first plurality of virtual machines is greater than actual resources available on the first physical machine;
   identify, based on the resource requirements schedule, that a first virtual machine of the first plurality of virtual machines and a second virtual machine of the first plurality of virtual machines have a complementary resource usage pattern;
   tie, based on the identification, the first virtual machine and the second virtual machine together to obtain a symbiotic pair of virtual machines; and
   release automatically to the second virtual machine, by the first virtual machine and based on being included in the symbiotic pair of virtual machines, a portion of the resources assigned to the first virtual machine to satisfy a resource need of the second virtual machine.

9. The non-transitory computer-readable medium of claim 1, wherein the resource usage requirements for each of the plurality of virtual machines comprises at least one of:
   a resource usage schedule broadcast by each of the first plurality of virtual machines; and
   a memory usage pattern of each of the first plurality of virtual machines determined via an analysis of each of the first plurality of virtual machines.

10. The non-transitory computer-readable medium of claim 8, further storing instructions that, when executed by the processor, cause the processor to:
   obtain resource usage requirements for a second plurality of virtual machines on at least one second physical machine;
   determine a resource requirements schedule for each of the second plurality of virtual machines based on the resource usage requirements for the second plurality of virtual machines;
   assign resources to each of the second plurality of virtual machines based on the resource requirements schedule of each of the second plurality of virtual machines, wherein a sum total of the resources allocated to the second plurality of virtual machines is greater than actual resources available on the at least one second physical machine;

identify, based on the resource requirements schedules of each of the first plurality of virtual machines and the second plurality of virtual machines, that at least one pair of virtual machines from at least one of the first plurality of virtual machines and second plurality of virtual machines have a complementary resource usage pattern;

tie, based on the identification, the at least one pair of virtual machines together to obtain at least one symbiotic pair of virtual machines; and redistribute the virtual machines from the first plurality of virtual machines and the second virtual machines among the first physical machine and the at least one second physical machine based on the at least one symbiotic pair.

11. The non-transitory computer-readable medium of claim 10, further comprising instructions that, when executed by the processor, cause the processor to automatically release to one of the virtual machines of the at least one symbiotic pair, by the other of the virtual machines of the at least one symbiotic pair, a portion of the resources assigned to the one of the virtual machines of the symbiotic pair to satisfy a resource need of the other of the virtual machines of the at least one symbiotic pair.

12. The non-transitory computer-readable medium of claim 8, wherein the resource usage requirements includes at least one or more of the following: memory usage, central processing unit (CPU) usage, storage space usage, and bandwidth usage.

13. The non-transitory computer-readable medium of claim 8, wherein the resource requirements schedule includes one or more of the following: time of day for which resources are used, day of the week for which resources are used, and amount of resources used at a given time or day.

14. The non-transitory computer-readable medium of claim 8, further comprising instructions that, when executed by the processor, cause the processor to share, among the first plurality of virtual machines, at least one of a CPU, a memory device, a storage device, and a network interface device of the first physical machine.

15. A system of implementing memory overcommit of virtual machines, the method comprising:

a first physical computer system programmed to run a first plurality of virtual machines;

a second physical computer system programmed to:
 obtain resource usage requirements for each of the first plurality of virtual machines;
 determine the a resource requirements schedule for each of the first plurality of virtual machines based on the resource usage requirements;
 assign resources to each of the first plurality of virtual machines based on the resource requirements schedule, wherein a sum total of the resources allocated to the first plurality of virtual machines is greater than actual resources available on the first physical computer system;
 identify, based on the resource requirements schedule, that a first virtual machine of the first plurality of virtual machines and a second virtual machine of the first plurality of virtual machines have a complementary resource usage pattern;
 tie, based on the identification, the first virtual machine and the second virtual machine together to obtain a symbiotic pair of virtual machines; and release automatically to the second virtual machine, by the first virtual machine and based on being included in the symbiotic pair of virtual machines, a portion of the resources assigned to the first virtual machine to satisfy a resource need of the second virtual machine.

16. The system of claim 15, wherein the resource usage requirements for each of the plurality of virtual machines comprises at least one of:

a resource usage schedule broadcast by each of the first plurality of virtual machines; and a memory usage pattern of each of the first plurality of virtual machines determined via an analysis of each of the first plurality of virtual machines.

17. The system of claim 15, further comprising:

at least one third physical computer system programmed to run a second plurality of virtual machines; and wherein the second physical computer system is further programmed to:
 obtain resource usage requirements for a second plurality of virtual machines on the at least one third physical computer system;
 determine a resource requirements schedule for each of the second plurality of virtual machines based on the resource usage requirements for the second plurality of virtual machines;
 assign resources to each of the second plurality of virtual machines based on the resource requirements schedule of each of the second plurality of virtual machines, wherein a sum total of the resources allocated to the second plurality of virtual machines is greater than actual resources available on the at least one third physical computer system;
 identify, based on the resource requirements schedules of each of the first plurality of virtual machines and the second plurality of virtual machines, that at least one pair of virtual machines from at least one of the first plurality of virtual machines and second plurality of virtual machines have a complementary resource usage pattern;
 tie, based on the identification, the at least one pair of virtual machines together to obtain at least one symbiotic pair of virtual machines; and
 redistribute the virtual machines from the first plurality of virtual machines and the second virtual machines among the first physical computer system and the at least one third physical computer system based on the at least one symbiotic pair.

18. The system of claim 17, wherein the second physical computer system is further programmed to automatically release to one of the virtual machines of the at least one symbiotic pair, by the other of the virtual machines of the at least one symbiotic pair, a portion of the resources assigned to the one of the virtual machines of the symbiotic pair to satisfy a resource need of the other of the virtual machines of the at least one symbiotic pair.

19. The system of claim 15, wherein the resource requirements schedule includes one or more of the following: time of day for which resources are used, day of the week for which resources are used, and amount of resources used at a given time or day.

20. The system of claim 15, wherein the first computer system is programmed to cause the first plurality of virtual machines to share at least one of a CPU, a memory device, a storage device, and a network interface device of the first computer system.

* * * * *

UNITED STATES PATENT AND TRADEMARK OFFICE
CERTIFICATE OF CORRECTION

| | |
|---|---|
| PATENT NO. | : 10,496,446 B2 |
| APPLICATION NO. | : 15/582780 |
| DATED | : December 3, 2019 |
| INVENTOR(S) | : Venkataraja et al. |

It is certified that error appears in the above-identified patent and that said Letters Patent is hereby corrected as shown below:

In the Drawings

On sheet 3 of 7, in FIG. 3, under Reference Numeral 325, Line 1, delete "requeirments" and insert -- requirements --, therefor.

In the Specification

In Column 4, Line 16, delete "Grid" and insert -- grid --, therefor.

In Column 9, Line 4, after "Microsoft™" insert -- , --.

In Column 10, Line 14, delete "my" and insert -- may --, therefor.

In Column 11, Line 29, delete "vise" and insert -- vice --, therefor.

In the Claims

In Column 14, Line 24, in Claim 8, delete "the a" and insert -- a --, therefor.

In Column 14, Lines 46-47, in Claim 9, delete "claim 1," and insert -- claim 8, --, therefor.

In Column 15, Line 51, in Claim 15, delete "the a" and insert -- a --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*